(12) United States Patent  (10) Patent No.: US 8,111,996 B2
Kato et al.  (45) Date of Patent: Feb. 7, 2012

(54) COMPACT OPTICAL MULTIPLEXER AND DEMULTIPLEXER

(75) Inventors: Masaki Kato, Palo Alto, CA (US); Charles H. Joyner, Sunnyvale, CA (US); Radhakrishnan L. Nagarajan, Cupertino, CA (US); Peter W. Evans, Mountain House, CA (US)

(73) Assignee: Infinera Corporation, Sunnyvale, CA (US)

( * ) Notice: Subject to any disclaimer, the term of this patent is extended or adjusted under 35 U.S.C. 154(b) by 528 days.

(21) Appl. No.: 12/391,027

(22) Filed: Feb. 23, 2009

(65) Prior Publication Data

US 2009/0274458 A1   Nov. 5, 2009

Related U.S. Application Data

(60) Provisional application No. 61/030,806, filed on Feb. 22, 2008.

(51) Int. Cl.
 *H04B 10/00* (2006.01)
(52) U.S. Cl. .......................................... 398/87; 398/200
(58) Field of Classification Search .............. 398/79–88, 398/200, 201
 See application file for complete search history.

(56) References Cited

U.S. PATENT DOCUMENTS

| | | | |
|---|---|---|---|
| 5,136,671 A * | 8/1992 | Dragone | 385/46 |
| 5,745,612 A * | 4/1998 | Wang et al. | 385/24 |
| 5,805,755 A * | 9/1998 | Amersfoort et al. | 385/131 |
| 5,889,906 A * | 3/1999 | Chen | 385/28 |
| 5,946,331 A * | 8/1999 | Amersfoort et al. | 372/23 |
| 6,049,640 A * | 4/2000 | Doerr | 385/15 |
| 6,240,118 B1 * | 5/2001 | Doerr et al. | 372/64 |
| 6,243,402 B1 * | 6/2001 | Doerr | 372/20 |
| 6,278,813 B1 * | 8/2001 | Takada et al. | 385/24 |
| 6,327,401 B1 * | 12/2001 | Doerr et al. | 385/24 |
| 6,347,166 B1 * | 2/2002 | Kuhlow et al. | 385/15 |
| 6,351,583 B1 * | 2/2002 | Bergmann et al. | 385/24 |
| 6,400,860 B1 * | 6/2002 | Chandrasekhar et al. | 385/24 |
| 6,421,478 B1 * | 7/2002 | Paiam | 385/24 |
| 6,442,308 B1 * | 8/2002 | Han et al. | 385/24 |
| 6,445,853 B1 * | 9/2002 | Kashihara et al. | 385/37 |
| 6,466,707 B1 * | 10/2002 | Dawes et al. | 385/14 |
| 6,512,615 B2 * | 1/2003 | Wu et al. | 398/87 |
| 6,512,864 B1 * | 1/2003 | Lin et al. | 385/24 |
| 6,580,862 B2 * | 6/2003 | Kominato et al. | 385/131 |
| 6,608,948 B2 * | 8/2003 | Delisle et al. | 385/24 |

(Continued)

*Primary Examiner* — Agustin Bello
(74) *Attorney, Agent, or Firm* — David L. Soltz

(57) ABSTRACT

Consistent with the present disclosure, an arrayed waveguide grating (AWG) is provided that includes first inputs and second inputs. Each of the first inputs receives a corresponding one of a plurality of first optical signals, each of which has a corresponding one of a plurality of wavelengths. Second inputs are also provided, such that each second input is preferably provided between two adjacent first inputs. Each of the second inputs receives a corresponding one of a plurality of second optical signals, and each of the second plurality of optical signals has a corresponding one of those wavelengths. Each of the first plurality of optical signals, however, has a first polarization and each of the second plurality of optical signals has a second polarization different than the first polarization. Since the first optical signals are supplied through AWG inputs that are offset from the inputs that receives second optical signals, the first optical signals are supplied at a first AWG output that is spaced from a second AWG output that supplies the second optical signals. The second optical signals are supplied through the second output even though the second optical signals have the same (or substantially the same) wavelengths as the first optical signals. Accordingly, a single AWG may be provided to multiplex both first and second optical signals, thereby simplifying PIC design.

17 Claims, 4 Drawing Sheets

U.S. PATENT DOCUMENTS

| | | | |
|---|---|---|---|
| 6,690,852 B2* | 2/2004 | Ogawa et al. | 385/24 |
| 6,735,364 B2* | 5/2004 | Kashihara et al. | 385/37 |
| 6,768,872 B1* | 7/2004 | Tsuritani et al. | 398/81 |
| 6,842,560 B2* | 1/2005 | Yamauchi et al. | 385/24 |
| 6,904,240 B1* | 6/2005 | Suga et al. | 398/79 |
| 6,931,034 B2* | 8/2005 | Khazaei et al. | 372/9 |
| 6,956,993 B2* | 10/2005 | Bernasconi | 385/37 |
| 6,993,217 B2* | 1/2006 | Maruyama et al. | 385/16 |
| 7,003,195 B1* | 2/2006 | Huang et al. | 385/24 |
| 7,016,568 B2* | 3/2006 | Van Weerden et al. | 385/37 |
| 7,031,355 B2* | 4/2006 | Khazaei et al. | 372/32 |
| 7,058,246 B2* | 6/2006 | Joyner et al. | 385/14 |
| 7,062,111 B2* | 6/2006 | Grubb et al. | 385/14 |
| 7,092,598 B2* | 8/2006 | Evans | 385/37 |
| 7,106,930 B2* | 9/2006 | Shen et al. | 385/37 |
| 7,123,793 B2* | 10/2006 | Ridgway | 385/37 |
| 7,127,168 B2* | 10/2006 | Kani et al. | 398/79 |
| 7,212,708 B2* | 5/2007 | Cheng et al. | 385/37 |
| 7,865,080 B2* | 1/2011 | Hecker et al. | 398/65 |
| 2005/0053324 A1* | 3/2005 | Ridgway | 385/23 |
| 2007/0223552 A1* | 9/2007 | Muendel et al. | 372/50.12 |
| 2009/0274458 A1* | 11/2009 | Kato et al. | 398/43 |
| 2011/0085802 A1* | 4/2011 | Bernasconi | 398/65 |

* cited by examiner

COMPACT OPTICAL MULTIPLEXER AND DEMULTIPLEXER

This application claims priority to U.S. Provisional Patent Application No. 61/030,806, filed Feb. 22, 2008, the disclosure of which is incorporated by reference herein in its entirety.

BACKGROUND OF THE INVENTION

1. Field of the Invention

Embodiments of the invention relate to the field of optical communication devices. More particularly, the present invention relates to a transmitter used for optical communication systems implemented on a photonic integrated circuit.

2. Discussion of Related Art

Wavelength division multiplexed (WDM) optical communication systems are known in which multiple optical signals, each having a different wavelength, are combined onto a single optical fiber. Such systems typically include a laser associated with each wavelength, a modulator configured to modulate the output of the laser, and an optical combiner to combine each of the modulated outputs. Conventionally, WDM systems have been constructed from discrete components. For example, the lasers, modulators and combiners have been packaged separately and mounted on a printed circuit board. More recently, however, many WDM components including transmitter, receivers and passive devices have been integrated onto a single chip also referred to as a photonic integrated circuit (PIC). In order to further increase data transmission rates associated with WDM systems, various modulation formats have been proposed for generating the modulated output. In accordance with one such format, different information is modulated on to optical signals having the same wavelength, but different polarizations. The optical signals are then polarization-multiplexed (pol-muxed) and combined with other pol-muxed optical signals onto a common optical fiber. One approach for combining such pol-muxed optical signals involved combining optical signals having a first polarization with a first WDM combiner to provide a first WDM signal and combing optical signals having a second polarization with a second WDM combiner to provide a second WDM signal. The first and second WDM signals are then combined with a polarization beam combiner (PBC). Integration of multiple WDM combiners on a PIC, however, complicates the design of the PIC and may reduce yields. Accordingly, a simpler design having fewer WDM combiners is advantageous.

DESCRIPTION OF EMBODIMENTS

Consistent with the present disclosure, an arrayed waveguide grating (AWG) is provided that includes first inputs and second inputs. Each of the first inputs receives a corresponding one of a plurality of first optical signals, each of which has a corresponding one of a plurality of wavelengths. Second inputs are also provided, such that each second input is preferably provided between two adjacent first inputs. Each of the second inputs receives a corresponding one of a plurality of second optical signals, and each of the second plurality of optical signals has a corresponding one of those wavelengths. Each of the first plurality of optical signals, however, has a first polarization and each of the second plurality of optical signals has a second polarization different than the first polarization. Since the first optical signals are supplied through AWG inputs that are offset from the inputs that receives second optical signals, the first optical signals are supplied at a first AWG output that is spaced from a second AWG output that supplies the second optical signals. The second optical signals are supplied through the second output even though the second optical signals have the same (or substantially the same) wavelengths as the first optical signals. Accordingly, a single AWG may be provided to multiplex both first and second optical signals, thereby simplifying PIC design.

Figure 1:
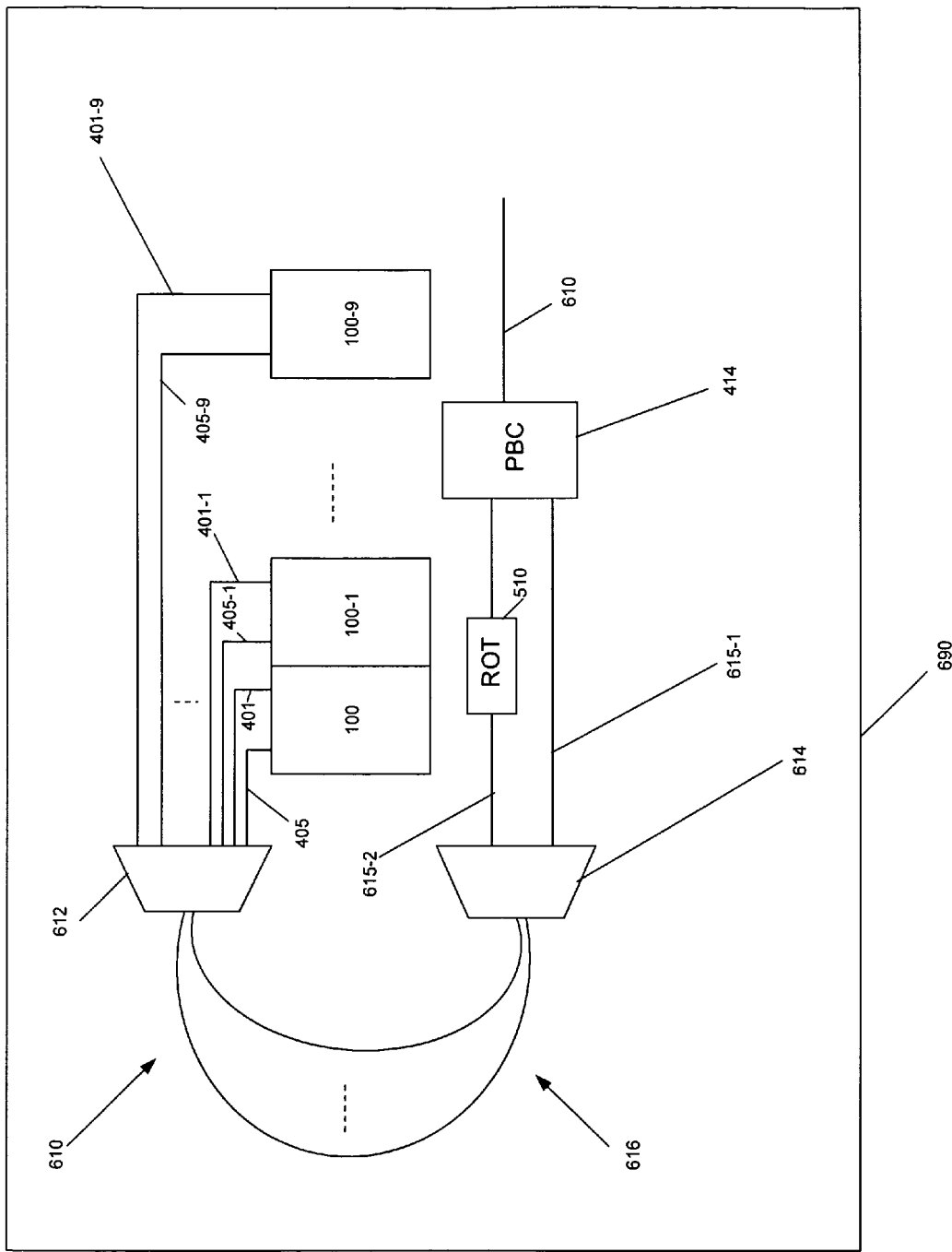
FIG. 1 is a schematic illustration of an alternative embodiment of the present invention employing AWG and a polarization rotator.

FIG. 1 is a schematic illustration of an embodiment of the present disclosure employing a single AWG 610 that multiplexed two groups of optical signals having the same wavelengths but different polarizations. The AWG receives optical signals from a plurality of transmitters 100, and 100-1 to 100-9, for example, and each transmitter supplies one of first optical signals at a particular wavelength and polarization and one of second optical signals at that wavelength, but at a different polarization. In addition, AWG 610 receives the first optical signals on inputs 405 and 405-1 to 405-9 and the second optical signals on inputs 401, and 401-1 to 401-9. The first and second optical signals may be modulated in accordance with a differential quadrature phase-shift keying (DQPSK) modulation format. AWG 610 and transmitters 100 and 100-1 to 100-9 may be provided on a substrate, including for example indium phosphide (InP). The first optical signals may have a first polarization and the second optical signals may have a second polarization different than the first polarization.

AWG 610 includes dielectric slabs or free space regions 612 and 614 and a plurality of waveguides 616 coupled therebetween. AWG 610 may have, for example, an associated transmission spectrum having a plurality of transmission maxima. This spectral spacing is ½ the spacing of multiplexers (or AWGs) 410 and 412 shown in FIG. 5. For example, if the channel spacing of each of the DFB lasers 108 to 108-9 of transmitter portions 100 to 100-9 is xGHz (e.g. 100 GHz) then the channel spacing of AWG 610 is x/2 GHz (e.g. 50 GHz). Thus, even though each of the optical signals 405 and 401 generated from transmitter portion 100 have the same wavelength (i.e. generated by a shared DFB 108), these signals 405 and 401 enter AWG 610 on different input arms having a spectral spacing x/2 GHz apart on free space region 612. Similarly, each of the optical signals 405-*n* and 401-*n* generated from a transmitter portion 100-*n* has the same wavelength generated by the shared DFB 108-*n* and enters AWG 610 on different input arms having a spectral spacing x/2 GHz apart on free space region 612. As a result, the output signal 405 emerges from free space region 614 on waveguide 615-2 and output signal 401 emerges from free space region 614 on waveguide 615-1. Likewise, all inputs to free space region 612 follow the pattern that the input signal (either 401-*y* or 405-*y*, where y=1 to 9) closest to the transmitter portion 100-*y* emerges from free space region 614 on waveguide 615-2; and the companion input (either 401-*y* or 405-*y*) emerges from free space region 614 on output waveguide 615-1. The signals that travel through AWG 610 may be in the TE polarization mode. Once the signals emerge from free space region 614, a first WDM signal output waveguide 615-2 is rotated by polarization rotator 510 (by π/2 radians, for example) and combined with the non-rotated second WDM signal on output waveguide 615-1 via polarization beam combiner (PBC) 414. The output of PBC 414 is supplied to output waveguide 610 as a third WDM signal.

An AWG may receive optical signals having different wavelengths on first inputs and output them on a single output provided at a particular location on an output side of free space region. If the locations at which input signals are supplied to the AWG shifts, however, the signals are output at different locations on the output side free space region, even though the input signals in both instances have the same wavelengths. Accordingly, as discussed in greater detail below, optical signals supplied on the first inputs 405 and 405-1 to 405-9 are supplied on output 615-1 while optical signals on second inputs 401 and 401-1 to 401-9 are supplied on output 615-1. Thus, a single optical component, namely, AWG 610 supplies two WDM output signals instead of two.

Figure 2:
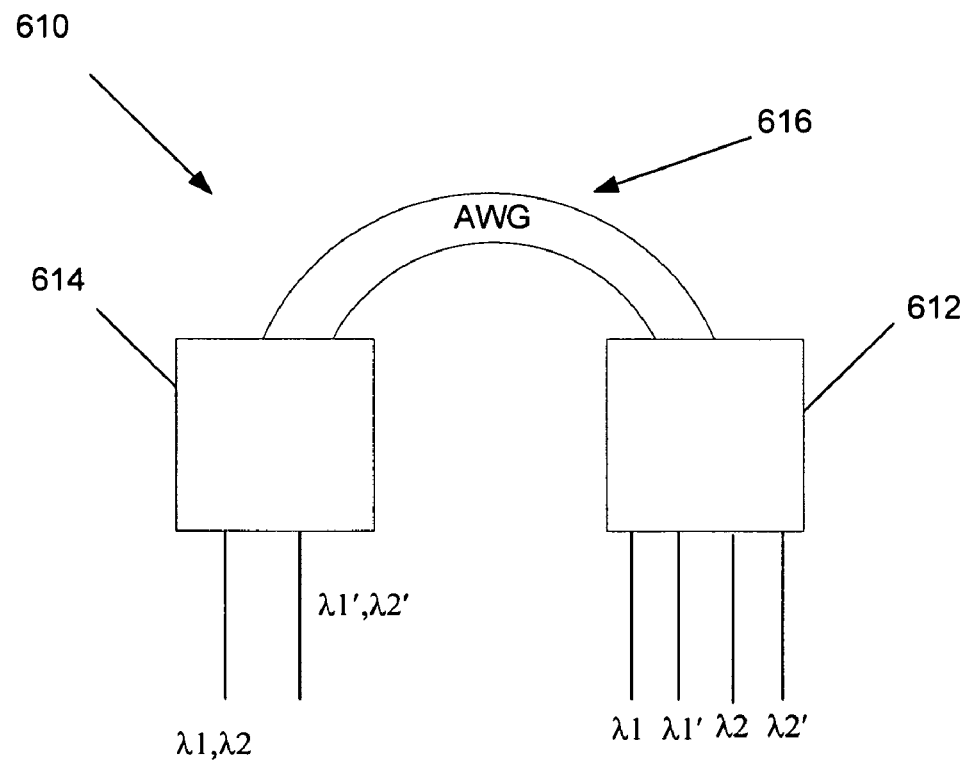
FIG. 2 is a block diagram illustrating the AWG shown in FIG. 6.

FIG. 2 is a block diagram of an exemplary AWG shown in FIG. 1 illustrating the combination of inputs from two of the transmitters 100 to 100-9 and the associated optical signals output therefrom to further illustrate the function of AWG 610. For example, transmitter 100 supplies one of the first optical signal having wavelength λ1 associated with input 405) to free space region 612 and one of the second optical signals having wavelength λ1' (associated with input 401) to free space region 612. The second transmitter, for example 100-1 supplies another one of the first optical signals having wavelength λ2 (which may correspond to input 405-1) to free space region 612 and another one of the second optical signals having wavelength λ2' (which may correspond to input 401-1) to free space region 612. AWG 610 preferably utilizes half the spectral spacing between adjacent wavelengths of the first optical signals to obviate the need for additional multiplexers. In particular, the spacing between the input ports to AWG 610 which receives signals having wavelengths λ1 and λ1' may be half the spacing between the input ports that receive the signals having wavelength λ1 and λ2. Similarly, the input ports to AWG 610 that receive signals having wavelengths λ2 and λ2' is typically half the spacing between the input ports that receive the signals having wavelengths λ1 and λ2. Thus, in this example, the signals having wavelengths λ1 and λ2 are output on a first output (corresponding to output 615-1 shown in FIG. 1) of second free space region 614 and the signals having wavelengths λ1' and λ2' are output via a second output (corresponding to output 615-2 shown in FIG. 1) of second free space region 614.

Figure 3:
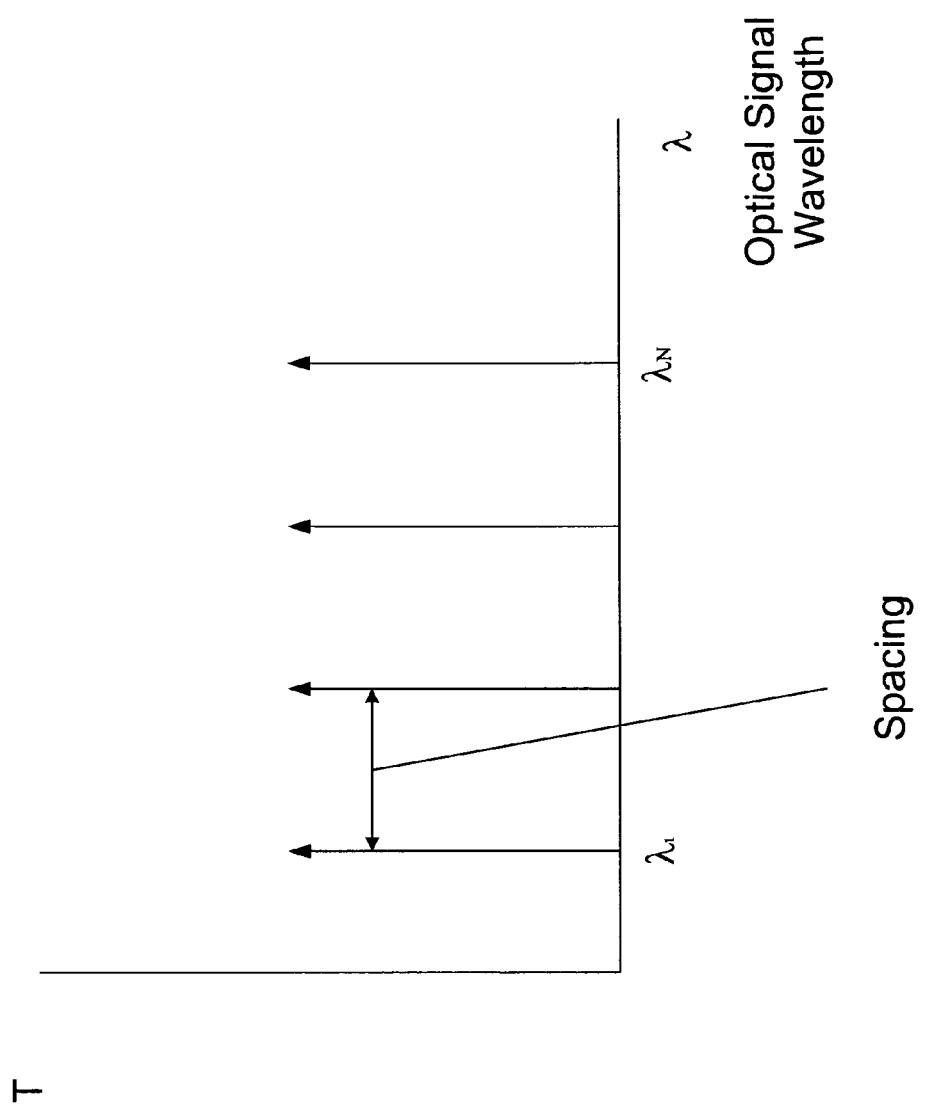
FIG. 3 is a transmission spectrum of a plurality of wavelengths received by an AWG consistent with an aspect of the present disclosure.
Figure 4:
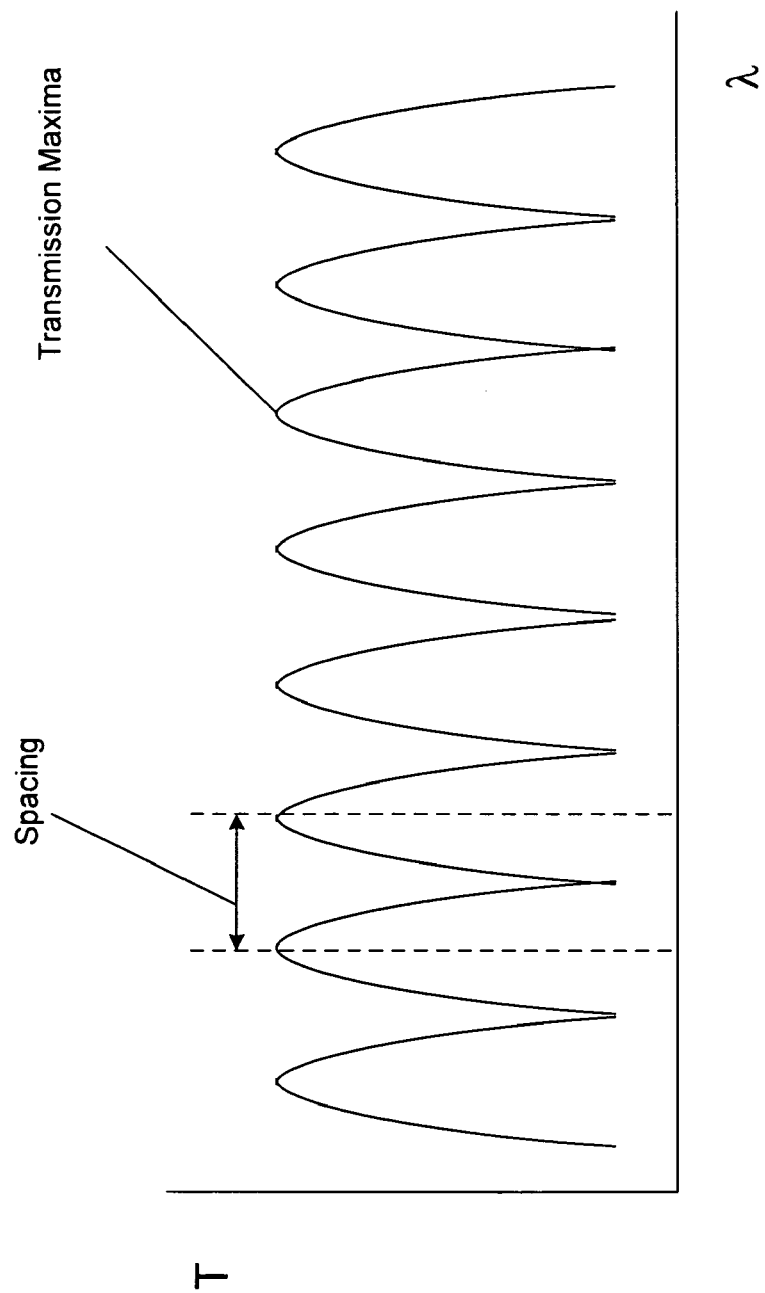
FIG. 4 is transmission spectrum associated with an AWG consistent with a further aspect of the present disclosure.

FIG. 3 illustrates a transmission spectrum for each of the plurality of wavelengths λ1 ... λN associated with transmitters 100 to 100-9 having a particular spectral spacing. FIG. 4 illustrates a transmission spectrum associated with AWG 610 which has a plurality of transmission maxima. Each of the transmission maxima of AWG 610 is separated from one another by a spectral spacing that is half of the spectral spacing associated with wavelengths λ1 ... λN shown in FIG. 3. In this manner, the first optical signals from each of the transmitters 100 to 100-9 are output by AWG on a first output port as a first wavelength division multiplexed optical signal and the second optical signals from each of the transmitters 100 to 100-9 are output by AWG 610 on a second output port as a second wavelength division multiplexed optical signal. Accordingly, as noted above, AWG 610 may replace multiple wavelength division multiplexers, thereby simplifying PIC design.

While the present invention has been disclosed with reference to certain embodiments, numerous modifications, alterations and changes to the described embodiments are possible without departing from the sphere and scope of the present invention, as defined in the appended claims. For example, although AWG 610 is described above as an optical multiplexer, it is understood that it could also operate as a demultiplexer, if each of the optical signals are supplied in a direction opposite that described above. In particular, WDM signals may be fed to, instead of output from, waveguides 615-1 to 615-2, and could then be separated and output on 405, 405-1 to 405-9, as well as 401, 201-1 to 401-9. Accordingly, it is intended that the present invention not be limited to the described embodiments, but that it has the full scope defined by the language of the following claims, and equivalents thereof.

What is claimed is:

1. A photonic integrated circuit, comprising:
a substrate:
a plurality of optical transmitters provided on the substrate, each of the plurality of optical transmitters supplying a corresponding one of a plurality of first optical signals and a corresponding one of a plurality of second optical signals, each of the first plurality of optical signals having a corresponding one of a plurality of wavelengths, and each of the second plurality of optical signals having said corresponding one of the plurality of wavelengths; and
an arrayed waveguide grating having a first plurality of input ports and a second plurality of input ports, each of the first plurality of input ports is configured to receive a respective one of the plurality of first optical signals, and each of the second plurality of input ports is configured to receive a respective one of the plurality of second optical signals,
wherein the arrayed waveguide grating further includes first and second output ports, the first output port being configured to supply a first wavelength division multiplexed signal including the plurality of first optical signals and the second output port is configured to supply a second wavelength division multiplexed optical signal including the plurality of second optical signals.

2. A photonic integrated circuit in accordance with claim 1, wherein the arrayed waveguide grating has an associated transmission spectrum, which has a plurality of transmission maxima, each of the transmission maxima being spectrally separated from one another by a first spectral spacing, each of the plurality of wavelengths being spectrally separated from one another by a second spectral spacing, the second spectral spacing being greater than the first spectral spacing.

3. A photonic integrated circuit in accordance with claim 2, wherein the first spectral spacing is substantially equal to half the second spectral spacing.

4. A photonic integrated circuit in accordance with claim 1, wherein each of the first plurality of optical signals has a first polarization and each of the second plurality of optical signals has a second polarization.

5. A photonic integrated circuit in accordance with claim 4, wherein each of the first polarization multiplexed optical signals is modulated in accordance with a differential quadrature phase-shift keying (DQPSK) format and each of the second polarization multiplexed optical signals is modulated in accordance with the DQPSK format.

6. A photonic integrated circuit in accordance with claim 2, wherein the first spectral spacing is substantially equal to 50 GHz and the second spectral spacing associated with the plurality of wavelengths is substantially equal to 100 GHz.

7. A photonic integrated circuit in accordance with claim 1, further including a polarization rotator provided on the substrate and coupled to the first output of the arrayed waveguide grating, the polarization rotator being configured to rotate a polarization of each of the plurality of first optical signals in the first wavelength division multiplexed optical signal to thereby supply a polarization rotated first wavelength division multiplexed optical signal.

8. A photonic integrated circuit in accordance with claim 7, further including an optical combiner, the optical combiner including a first input configured to receive the polarization rotated first wavelength division multiplexed optical signal and a second input configured to receive the second wavelength division multiplexed optical signal, the optical combiner having an output that supplies a third wavelength division multiplexed optical signal.

9. A photonic integrated circuit in accordance with claim 8, wherein the optical combiner is a polarization beam combiner.

10. A photonic integrated circuit in accordance with claim 1, wherein the substrate includes InP.

11. A photonic integrated circuit, comprising:
a substrate:
a plurality of optical transmitters provided on the substrate, each of the plurality of optical transmitters supplying a corresponding one of a plurality of first optical signals and a corresponding one of a plurality of second optical signals, each of the first plurality of optical signals having a corresponding one of a plurality of wavelengths, and each of the second plurality of optical signals having said corresponding one of the plurality of wavelengths;
a first optical combiner provided on the substrate and having a first plurality of input ports and a second plurality of input ports, each of the first plurality of input ports is configured to receive a respective one of the plurality of first optical signals, and each of the second plurality of input ports is configured to receive a respective one of the plurality of second optical signals,
wherein the optical combiner further includes first and second output ports, the first output port being configured to supply a first wavelength division multiplexed signal including the plurality of first optical signals and the second output port is configured to supply a second wavelength division multiplexed signal including the plurality of second optical signals.

12. A photonic integrated circuit in accordance with claim 11, wherein the polarization of said each of the plurality of first optical signals in the first wavelength division multiplexed signal is rotated $\pi/2$ radians.

13. A photonic integrated circuit in accordance with claim 11, wherein the first optical combiner includes an arrayed waveguide grating.

14. A photonic integrated circuit in accordance with claim 11, further including a polarization rotator provided on the substrate and configured to rotate a polarization of each of the plurality of first optical signals in the first wavelength division multiplexed signal to thereby supply a rotated wavelength division multiplexed signal.

15. A photonic integrated circuit in accordance with claim 11, wherein the combiner is a first combiner, the photonic integrated circuit further including a second combiner provided on the substrate and configured to combine the rotated wavelength division multiplexed signal and the second wavelength division multiplexed signal.

16. A photonic integrated circuit in accordance with claim 15, wherein the second combiner is a polarization beam combiner.

17. A photonic integrated circuit in accordance with claim 11, wherein the substrate includes InP.

* * * * *